Figure 1:
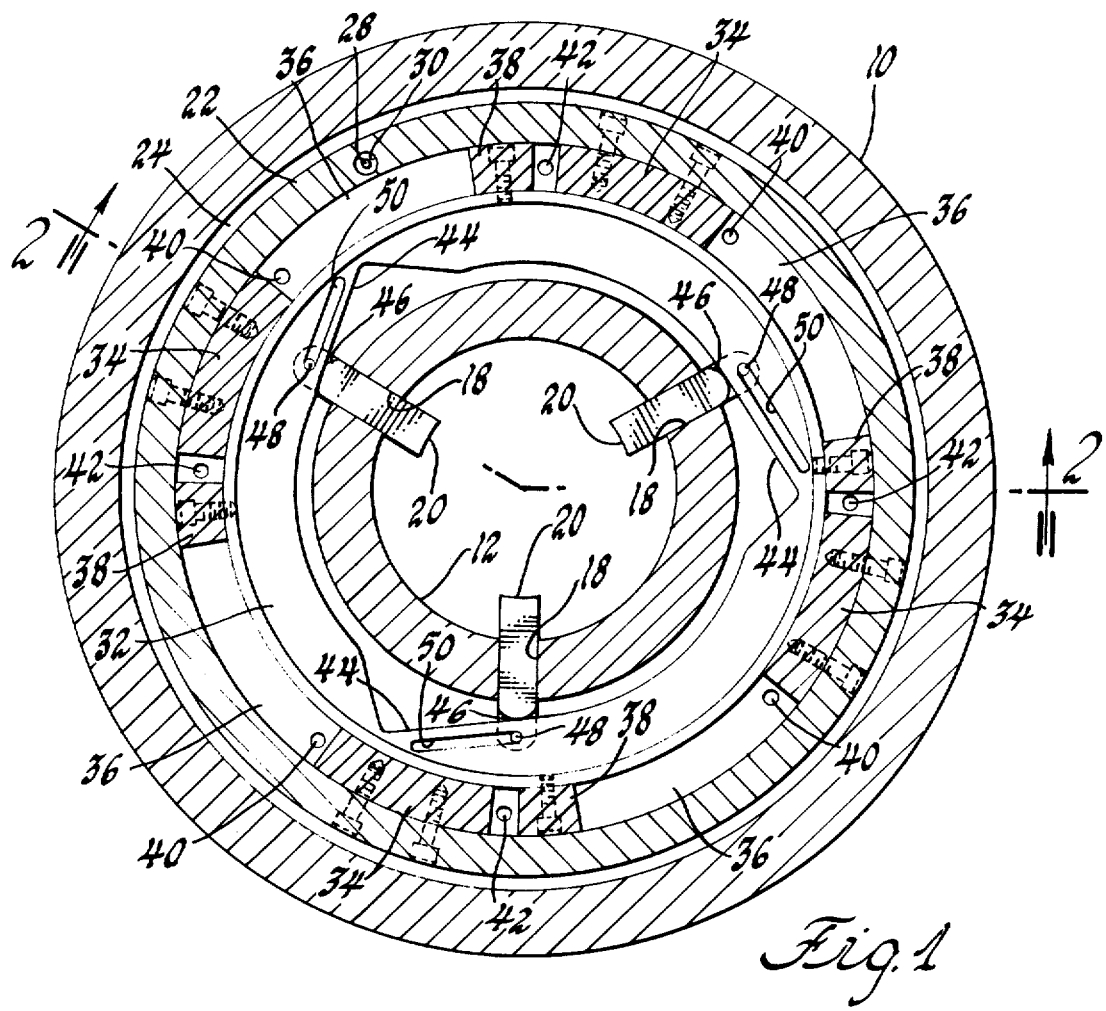

United States Patent [19]
Jackson et al.

[11] 3,892,419
[45] July 1, 1975

[54] BALANCED FLOATING MACHINE TOOL CHUCK

[75] Inventors: Richard C. Jackson, Bloomfield Hills; Eberhard E. Wasserbaech, Sterling Heights, both of Mich.

[73] Assignee: General Motors Corporation, Detroit, Mich.

[22] Filed: June 19, 1974

[21] Appl. No.: 480,936

[52] U.S. Cl. ................. 279/4; 279/1 J; 279/1 L; 279/6; 279/114
[51] Int. Cl. ................. B23b 31/16; B23b 31/30
[58] Field of Search ............. 279/1 J, 1 L, 1 ME, 4, 279/6, 110, 114

[56] References Cited
UNITED STATES PATENTS

| | | | |
|---|---|---|---|
| 1,350,746 | 8/1920 | Spillman | 279/114 |
| 2,825,572 | 3/1958 | Sloan et al. | 279/1 J |
| 2,828,134 | 3/1958 | Buck et al. | 279/1 J |

*Primary Examiner*—Gil Weidenfeld
*Attorney, Agent, or Firm*—Warren D. Hill

[57] ABSTRACT

A chuck mechanism is movably mounted within a housing to allow the chuck jaws to engage an eccentrically located workpiece surface. A generally annular chamber formed between the floating mechanism and the housing is filled with a liquid having a density equal to the average density of the movable chuck mechanism such that when the mechanism moves in one direction within the housing, the liquid is displaced in the opposite direction to maintain a balance of the chuck.

3 Claims, 2 Drawing Figures

3,892,419

BALANCED FLOATING MACHINE TOOL CHUCK

This invention relates to machine tool chucks and particularly to an unbalance compensating arrangement for floating chucks.

In some applications, a workpiece to be clamped by a chuck is prepositioned according to an established center with the result that the workpiece surfaces to be engaged by the jaws of the chuck are eccentrically located relative to the chuck. There are also cases where chips from a previous machining operation become lodged between a jaw and a workpiece during the clamping operation so that the effect of the chips is to eccentrically displace the chuck or the workpiece. To compensate for these occurrences, it is desirable to have floating jaws and jaw operating mechanism which automatically shift to accommodate such eccentricities. A problem with utilizing such a floating mechanism is that a rotational unbalance is introduced when the mechanism is eccentrically located. That problem is especially acute for large chucks which operate at high speeds. It has previously been proposed to compensate for such unbalance by a counterbalance weight connected to the chuck mechanism by a mechanical linkage. Such proposed counter weights have been in a plane spaced from a chuck mechanism so that dynamic unbalance is introduced even though static balance is achieved.

A general object of the invention is to provide a machine tool chuck having a floating chuck mechanism which is maintained in a dynamic balance condition.

A further object of this invention is to provide a machine tool chuck with floating chuck mechanism utilizing a balance compensating arrangement requiring no moving mechanical parts.

Another object of the invention is to provide such a machine tool chuck utilizing a liquid counterbalance in the plane of the chuck mechanism.

The invention is carried out by providing a chuck mechanism floatingly mounted within a chuck housing there being a space between the mechanism and the housing to allow the mechanism to float and by providing a liquid in that space having a density equal to the average density of the chuck mechanism.

Figure 2:
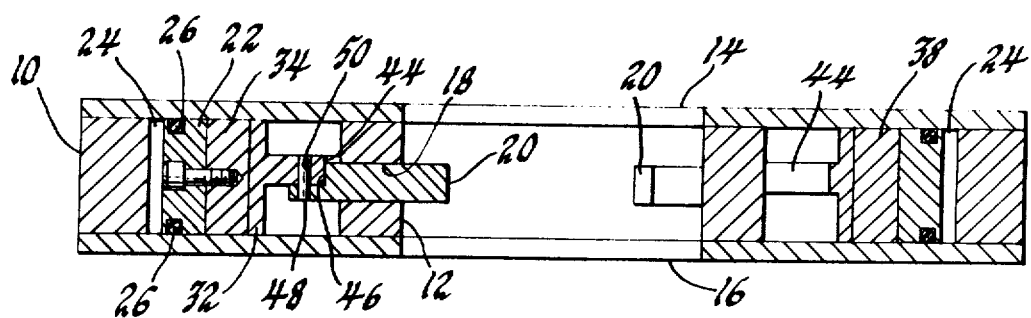

The above and other advantages will be made more apparent from the following specification taken in conjunction with the accompanying drawings wherein like reference numerals refer to like parts and wherein;

FIG. 1 is a cross-sectional view of a machine tool chuck according to the invention, and FIG. 2 is a cross-sectional view taken along line 2—2 of FIG. 1.

As shown in the drawings, a chuck housing includes an outer annular wall 10 and an inner annular wall 12 and a pair of flat side walls 14 and 16 interconnecting the walls 10 and 12 to form a hollow annular housing. Three equally spaced apertures 18 are formed in the inner wall 12 each for slidingly receiving a jaw 20 having one end extending within the housing and the other end extendable into the hollow center opening of the housing. A cam trap ring 22 positioned within the housing has an outer diameter slightly smaller than the inner diameter of the end wall 10 to define a chamber or gap 24 between the cam trap ring 22 and the end wall 10 which allows the trap ring 22 to float or slide within the housing. O-rings 26 mounted in annular grooves on either side of the trap ring 22 provide a liquid seal between the trap ring and the side walls 14 and 16. A pin 28 extending from a side wall protrudes into an oversized aperture 30 in the trap ring to limit the movement of the trap ring.

A cam ring 32 smaller than the trap ring 22 is concentrically located therein to form an annular space therebetween. Four equally spaced arcuate reaction members 34 secured to the trap ring 22 separate the annular space into four working chambers 36 and also provide bearing and locating surfaces for the cam ring 32. Four equally spaced pistons 38 secured to the cam ring 32 each extend into a working chamber 36 such that a fluid motor is formed between the trap ring and the cam ring. Fluid ports 40, 42 connected to a pressurized working fluid such as hydraulic fluid or compressed air by conventional means, not shown, are located adjacent each end of each reaction member 34. Thus when fluid pressure is applied via ports 40, the pressure acting on the piston 38 drives the cam ring 32 in a clockwise direction to the position shown in the drawing; whereas, when the fluid pressure is applied via ports 42, the cam ring is rotated in the opposite direction. The internal portion of the cam ring is contoured to form three cam sections 44, each engaging a cam follower portion 46 on the internal end of a jaw 20 to drive the jaws 20 toward the hollow center of the chuck to engage a workpiece. A flange portion on each jaw 20 carries a pin 48 spaced from the cam follower 46, which pin enters a slot 50 in the cam ring and serves to retract the jaw 20 when the cam ring is rotated counterclockwise.

The chamber 24 between the outer annular wall 10 and the trap ring 22 is filled with a liquid having a density equal to the average density of the floating chuck mechanism, i.e. the trap ring 22, the cam ring 32, the jaws 20 and all other jaw operating components exclusive of the chuck housing. The "Average Density" as used herein refers to the density of all the chuck mechanism including air spaces therein. Thus due to the liquid in the chamber 24, the center of mass of the chuck remains at the geometric center of the chuck even though the chuck mechanism shifts to an eccentric position. When the mechanism shifts in one direction, the liquid trapped in chamber 24 experiences a net shift in the opposite direction to compensate for the unbalance which otherwise would have occurred due to the eccentricity of the chuck mechanism. The liquid may be oil like that which could be used as the hydraulic fluid in the fluid motor or it may be another type of liquid selected according to the required density. As a specific example of a particular chuck design, a chuck mechanism having a diameter of about 24 inches measured across the trap ring and allowing up to 0.1 inch displacement from a concentric position may be balanced by oil in the chamber 24 having a specific gravity of 0.9 provided that the chuck mechanism is designed to have an average density of 0.9.

In operation, a workpiece is prepositioned in the hollow center of the chuck and a working fluid is applied to the pistons 38 through the ports 40 (the ports 42 being opened to a drain) to cause clockwise rotation of the cam ring 32 and the inward movement of the jaws 20 to engage the workpiece. In the event the three jaws simultaneously contact the workpiece, clamping will occur without any lateral shift of the chuck mechanism. When, however, only one or two jaws contact the workpiece, the chuck mechanism will shift to allow engagement of all the jaws with the workpiece; the liquid in the chamber 24 meanwhile shifting in the opposite direction to maintain chuck balance.

The chuck mechanism described herein contains a conventional self-locking feature such that due to reaction forces between the jaws and the walls of the apertures 18, the jaws bind in the apertures 18 so long as high pressure is maintained between the cam ring 32 and the workpiece through the jaws 20. Thus the chuck mechanism is securely locked in place and cannot float while the workpiece is clamped in the jaws 20.

It will be noted that the balancing feature according to this invention requires no moving mechanical parts. Since the counterbalancing agent, e.g. the liquid in chamber 24, is in the plane of the chuck mechanism, dynamic balance is attained unlike a balancing system which utilizes a counterbalance in another plane. Therefore, the balancing arrangement of this invention is particularly suitable for high speeds of rotation, say 2000 RPM for the chuck described in the specific example above.

The embodiment of the invention described herein is for purposes of illustration and the scope of the invention is intended to be limited only by the following claims:

What is claimed is:

1. A balanced floating chuck for a machine tool for concentrically or eccentrically clamping a workpiece therein comprising a chuck housing, floating chuck means mounted in movable relationship within the housing for allowing radial movement of the mechanism to eccentric locations relative to the center of said housing, a chamber surrounding the chuck means defined by the housing and the chuck means, and a liquid filling the chamber, the density of the liquid being substantially equal to the average density of the chuck means so that the chuck means remains balanced when the chuck means is eccentrically located within the chuck housing.

2. A balanced floating chuck for a machine tool for concentrically or eccentrically clamping a workpiece therein comprising a chuck housing including spaced concentric inner and outer annular walls and a pair of side walls interconnecting the annular walls.

floating chuck means supported within the housing for radial movement relative thereto to and in movable sealing engagement with the side walls, the chuck means being smaller than the outer annular wall on the radial dimension to define a chamber bounded by the chuck means, the outer annular wall and the side walls, and a liquid completely filling said chamber, the liquid having a density substantially equal to the average density of the chuck means so that the chuck means remains balanced when the chuck means is eccentrically located within the chuck housing.

3. A balanced floating chuck for a machine tool for eccentrically or concentrically clamping a workpiece therein comprising a chuck housing including spaced concentric inner and outer annular walls and a pair of side walls interconnecting the annular walls, the inner annular wall having a plurality of equally spaced openings extending radially therethrough, a floating chuck mechanism supported within the housing comprising a ring smaller than the outer annular wall in the radial dimension to define a chamber between the ring and the outer annular wall and the side walls, the ring being in sealing engagement with the side walls and slidably movable relative thereto in the absence of clamping pressure on the workpiece, clamping jaws slidably extending through the openings in the inner annular wall, and means within the ring and connected with the jaws for movably operating the jaws, and a liquid completely filling said chamber, the liquid having a density substantially equal to the average density of the floating chuck mechanism so that the chuck remains balanced when the chuck mechanism is eccentrically located within the chuck housing.

\* \* \* \* \*